(12) United States Patent
Koyama

(10) Patent No.: US 9,423,529 B2
(45) Date of Patent: Aug. 23, 2016

(54) ANTIREFLECTION COATING, OPTICAL SYSTEM, AND OPTICAL INSTRUMENT

(71) Applicant: Olympus Corporation, Tokyo (JP)

(72) Inventor: Masanori Koyama, Tachikawa (JP)

(73) Assignee: Olympus Corporation, Tokyo (JP)

( * ) Notice: Subject to any disclaimer, the term of this patent is extended or adjusted under 35 U.S.C. 154(b) by 113 days.

(21) Appl. No.: 13/950,519

(22) Filed: Jul. 25, 2013

(65) Prior Publication Data

US 2013/0308196 A1    Nov. 21, 2013

Related U.S. Application Data

(63) Continuation of application No. PCT/JP2012/063854, filed on May 30, 2012.

(30) Foreign Application Priority Data

Jun. 10, 2011 (JP) ................. 2011-130083

(51) Int. Cl.
   *G02B 27/00* (2006.01)
   *G02B 1/11* (2015.01)
   *G02B 1/115* (2015.01)

(52) U.S. Cl.
   CPC *G02B 1/11* (2013.01); *G02B 1/115* (2013.01)

(58) Field of Classification Search
   CPC .... G02B 5/18; G02B 5/1809; G02B 5/1876; G02B 5/1814; G02B 5/1852; G02B 5/1847; G02B 5/1866; G02B 1/041; G02B 27/4211; G02B 2006/12107; G02B 27/0037; G02B 27/44
   USPC .............. 359/2, 291, 247, 569, 576, 601
   See application file for complete search history.

(56) References Cited

U.S. PATENT DOCUMENTS

| 2008/0231957 A1 | 9/2008 | Terayama |
| 2010/0128350 A1* | 5/2010 | Findlay ........... G02B 1/118 359/601 |

FOREIGN PATENT DOCUMENTS

| JP | 9-325211 A | 12/1997 |
| JP | 2004-163549 A | 6/2004 |
| JP | 2005-275294 A | 10/2005 |
| JP | 2005-338366 A | 12/2005 |

(Continued)

OTHER PUBLICATIONS

International Preliminary Report on Patentability dated Dec. 27, 2013, issued in International Application No. PCT/JP2012/063854 (with English translation thereof).

(Continued)

*Primary Examiner* — Pascal M. Bui-Pho
*Assistant Examiner* — Sharrief Broome
(74) *Attorney, Agent, or Firm* — Arent Fox LLP; Steven Weisburd

(57) ABSTRACT

An antireflection coating has a band ranging from the visible light range to the near infrared range. The antireflection coating has a deposition structure made up of twelve layers in which layers of a high refractive index material having a refractive index nH of 1.95 to 2.32 and layers of a low refractive index material having a refractive index of 1.35 to 1.46 are deposited alternately, wherein the reflectance of the antireflection coating is not higher than 1.5% in the wavelength range of 400 nm to 680 nm and not higher than 2.0% in the wavelength range of 680 nm to 1350 nm.

5 Claims, 26 Drawing Sheets

(56) References Cited

FOREIGN PATENT DOCUMENTS

| | | | |
|---|---|---|---|
| JP | 2006-349775 A | | 12/2006 |
| JP | 2008-158145 A | | 7/2008 |
| JP | 2008158145 A | * | 7/2008 |
| JP | 2008-233622 A | | 10/2008 |
| JP | 2008233622 A | * | 10/2008 |

OTHER PUBLICATIONS

A.V. Tikhonravov et al.; Quasi-optimal synthesis for antireflection coatings: a new method; Applied Optics, Optical Society of America, vol. 32, No. 22, Aug. 1, 1993, pp. 4265-4275.

European Search Report dated Feb. 4, 2015, issued in corresponding European Patent Application No. 12796000.3.

Japanese Office Action dated Apr. 30, 2015, issued in based Japanese Patent Application No. 2011-130083 (with English translation thereof).

International Search Report dated Jul. 10, 2012, issued in International Application No. PCT/JP2012/063854 (with English translation thereof).

H.A. Macleod; "Thin Film Optical Filters"; Nikkan Kogyo Shinbunsha Shuppan, Dec. 1989, pp. 118, 129-130 (with English translation thereof).

* cited by examiner

FIG. 2

| LAYER NUMBER | LAYER MATERIAL | OPTICAL FILM THICKNESS | | |
|---|---|---|---|---|
| | | EXAMPLE 1 REFRACTIVE INDEX OF SUBSTRATE n=1.48 | EXAMPLE 2 REFRACTIVE INDEX OF SUBSTRATE n=1.60 | EXAMPLE 3 REFRACTIVE INDEX OF SUBSTRATE n=1.70 |
| | | SUBSTRATE | | |
| 1 | $HfO_2$ | 0.11 | 0.17 | 0.21 |
| 2 | $SiO_2$ | 0.72 | 0.52 | 0.34 |
| 3 | $HfO_2$ | 0.33 | 0.45 | 0.57 |
| 4 | $SiO_2$ | 0.54 | 0.44 | 0.33 |
| 5 | $HfO_2$ | 0.63 | 0.72 | 0.81 |
| 6 | $SiO_2$ | 0.22 | 0.19 | 0.15 |
| 7 | $HfO_2$ | 1.55 | 1.50 | 1.51 |
| 8 | $SiO_2$ | 0.06 | 0.09 | 0.11 |
| 9 | $HfO_2$ | 0.94 | 0.91 | 0.86 |
| 10 | $SiO_2$ | 0.37 | 0.39 | 0.41 |
| 11 | $HfO_2$ | 0.42 | 0.41 | 0.40 |
| 12 | $MgF_2$ | 1.24 | 1.22 | 1.22 |
| | | AIR | | |

FIG. 4

| REFLECTANCE | WAVELENGTH RANGE | EXAMPLE 1 | | EXAMPLE 2 | | | EXAMPLE 3 | | |
|---|---|---|---|---|---|---|---|---|---|
| | | n=1.48 | n=1.45 | n=1.54 | n=1.60 | n=1.54 | n=1.64 | n=1.70 | n=1.65 | n=1.80 |
| AVERAGE(%) | 400nm~680nm | 0.78 | 0.78 | 0.83 | 0.82 | 0.82 | 0.87 | 0.85 | 0.86 | 0.93 |
| | 680nm~1350nm | 1.14 | 1.19 | 1.10 | 1.20 | 1.30 | 1.15 | 1.25 | 1.22 | 1.17 |
| MAXIMUM(%) | 400nm~680nm | 0.93 | 1.09 | 1.11 | 0.98 | 1.24 | 1.23 | 1.02 | 1.07 | 1.45 |
| | 680nm~1350nm | 1.33 | 1.39 | 1.57 | 1.59 | 1.66 | 1.58 | 1.73 | 1.73 | 1.84 |

FIG. 7

| LAYER NUMBER | LAYER MATERIAL | OPTICAL FILM THICKNESS | | |
|---|---|---|---|---|
| | | EXAMPLE 4 REFRACTIVE INDEX OF SUBSTRATE n=1.48 | EXAMPLE 5 REFRACTIVE INDEX OF SUBSTRATE n=1.60 | EXAMPLE 6 REFRACTIVE INDEX OF SUBSTRATE n=1.70 |
| | | SUBSTRATE | | |
| 1 | $TiO_2$ | 0.18 | 0.21 | 0.25 |
| 2 | $MgF_2$ | 0.52 | 0.42 | 0.34 |
| 3 | $TiO_2$ | 0.43 | 0.47 | 0.53 |
| 4 | $MgF_2$ | 0.34 | 0.28 | 0.23 |
| 5 | $TiO_2$ | 0.64 | 0.64 | 0.65 |
| 6 | $MgF_2$ | 0.13 | 0.10 | 0.08 |
| 7 | $TiO_2$ | 2.29 | 2.26 | 2.24 |
| 8 | $MgF_2$ | 0.10 | 0.11 | 0.12 |
| 9 | $TiO_2$ | 0.59 | 0.60 | 0.61 |
| 10 | $MgF_2$ | 0.34 | 0.35 | 0.35 |
| 11 | $TiO_2$ | 0.32 | 0.31 | 0.32 |
| 12 | $MgF_2$ | 1.17 | 1.15 | 1.17 |
| | | AIR | | |

FIG. 9

| REFLECTANCE | WAVELENGTH RANGE | EXAMPLE 4 | | EXAMPLE 5 | | | EXAMPLE 6 | | |
|---|---|---|---|---|---|---|---|---|---|
| | | n=1.48 | n=1.45 | n=1.54 | n=1.60 | n=1.54 | n=1.64 | n=1.70 | n=1.65 | n=1.80 |
| AVERAGE(%) | 400nm~680nm | 0.69 | 0.69 | 0.75 | 0.72 | 0.71 | 0.76 | 0.71 | 0.70 | 0.83 |
| | 680nm~1350nm | 1.05 | 1.12 | 0.97 | 1.05 | 1.16 | 1.00 | 1.05 | 1.15 | 0.99 |
| MAXIMUM(%) | 400nm~680nm | 1.04 | 1.17 | 1.23 | 0.98 | 1.29 | 1.12 | 0.92 | 1.22 | 1.30 |
| | 680nm~1350nm | 1.47 | 1.65 | 1.33 | 1.33 | 1.60 | 1.32 | 1.26 | 1.54 | 1.57 |

FIG. 12

| LAYER NUMBER | LAYER MATERIAL | OPTICAL FILM THICKNESS | | |
|---|---|---|---|---|
| | | EXAMPLE 7 REFRACTIVE INDEX OF SUBSTRATE n=1.48 | EXAMPLE 8 REFRACTIVE INDEX OF SUBSTRATE n=1.60 | EXAMPLE 9 REFRACTIVE INDEX OF SUBSTRATE n=1.70 |
| | | SUBSTRATE | | |
| 1 | $Ta_2O_5$ | 0.13 | 0.16 | 0.20 |
| 2 | $SiO_2$ | 0.68 | 0.51 | 0.39 |
| 3 | $Ta_2O_5$ | 0.39 | 0.44 | 0.51 |
| 4 | $SiO_2$ | 0.43 | 0.41 | 0.30 |
| 5 | $Ta_2O_5$ | 0.71 | 0.73 | 0.75 |
| 6 | $SiO_2$ | 0.15 | 0.18 | 0.12 |
| 7 | $Ta_2O_5$ | 1.58 | 1.46 | 1.65 |
| 8 | $SiO_2$ | 0.11 | 0.11 | 0.11 |
| 9 | $Ta_2O_5$ | 0.74 | 0.84 | 0.70 |
| 10 | $SiO_2$ | 0.43 | 0.42 | 0.43 |
| 11 | $Ta_2O_5$ | 0.35 | 0.39 | 0.35 |
| 12 | $MgF_2$ | 1.27 | 1.26 | 1.27 |
| | | AIR | | |

FIG. 14

| REFLECTANCE | | WAVELENGTH RANGE | EXAMPLE 7 | | | EXAMPLE 8 | | | EXAMPLE 9 | | |
|---|---|---|---|---|---|---|---|---|---|---|---|
| | | | n=1.48 | n=1.45 | n=1.54 | n=1.60 | n=1.54 | n=1.64 | n=1.70 | n=1.65 | n=1.80 |
| AVERAGE(%) | | 400nm~680nm | 0.75 | 0.73 | 0.83 | 0.82 | 0.81 | 0.87 | 0.75 | 0.74 | 0.87 |
| | | 680nm~1350nm | 0.92 | 0.97 | 0.87 | 1.01 | 1.10 | 0.99 | 0.91 | 0.99 | 0.88 |
| MAXIMUM(%) | | 400nm~680nm | 0.97 | 0.98 | 1.31 | 1.11 | 1.22 | 1.15 | 1.01 | 1.11 | 1.28 |
| | | 680nm~1350nm | 1.13 | 1.35 | 1.23 | 1.23 | 1.63 | 1.39 | 1.12 | 1.52 | 1.49 |

FIG. 17

| LAYER NUMBER | LAYER MATERIAL | OPTICAL FILM THICKNESS |
|---|---|---|
| SUBSTRATE (REFRACTIVE INDEX: 1.49) | | |
| 1 | $Ta_2O_5$ | 0.14 |
| 2 | $SiO_2$ | 0.67 |
| 3 | $Ta_2O_5$ | 0.41 |
| 4 | $SiO_2$ | 0.44 |
| 5 | $Ta_2O_5$ | 0.73 |
| 6 | $SiO_2$ | 0.20 |
| 7 | $Ta_2O_5$ | 1.24 |
| 8 | $SiO_2$ | 0.15 |
| 9 | $Ta_2O_5$ | 0.82 |
| 10 | $SiO_2$ | 0.44 |
| 11 | $Ta_2O_5$ | 0.24 |
| 12 | $MgF_2$ | 1.25 |
| AIR | | |

FIG. 19

| REFLECTANCE | | WAVELENGTH RANGE | EXAMPLE 10 | EXAMPLE 11 | EXAMPLE 12 | EXAMPLE 13 |
|---|---|---|---|---|---|---|
| AVERAGE(%) | | 400nm~680nm | 0.93 | 0.93 | 0.93 | 0.93 |
| | | 680nm~1350nm | 0.75 | 0.79 | 0.74 | 0.75 |
| MAXIMUM(%) | | 400nm~680nm | 1.26 | 1.39 | 1.30 | 1.26 |
| | | 680nm~1350nm | 0.97 | 1.16 | 0.93 | 0.97 |

FIG. 20

| LAYER NUMBER | LAYER MATERIAL | OPTICAL FILM THICKNESS |
|---|---|---|
| SUBSTRATE (REFRACTIVE INDEX: 1.57) | | |
| 1 | $HfO_2$ | 0.15 |
| 2 | $SiO_2$ | 0.55 |
| 3 | $HfO_2$ | 0.41 |
| 4 | $SiO_2$ | 0.46 |
| 5 | $HfO_2$ | 0.69 |
| 6 | $SiO_2$ | 0.20 |
| 7 | $HfO_2$ | 1.54 |
| 8 | $SiO_2$ | 0.08 |
| 9 | $HfO_2$ | 0.91 |
| 10 | $SiO_2$ | 0.38 |
| 11 | $HfO_2$ | 0.42 |
| 12 | $MgF_2$ | 1.24 |
| AIR | | |

FIG. 22

| LAYER NUMBER | LAYER MATERIAL | OPTICAL FILM THICKNESS |
|---|---|---|
| SUBSTRATE (REFRACTIVE INDEX: 1.57) | | |
| 1 | $TiO_2$ | 0.15 |
| 2 | $MgF_2$ | 0.55 |
| 3 | $TiO_2$ | 0.41 |
| 4 | $MgF_2$ | 0.46 |
| 5 | $TiO_2$ | 0.69 |
| 6 | $MgF_2$ | 0.20 |
| 7 | $TiO_2$ | 1.54 |
| 8 | $MgF_2$ | 0.08 |
| 9 | $TiO_2$ | 0.91 |
| 10 | $MgF_2$ | 0.38 |
| 11 | $TiO_2$ | 0.42 |
| 12 | $MgF_2$ | 1.24 |
| AIR | | |

FIG. 24

| LAYER NUMBER | LAYER MATERIAL | OPTICAL FILM THICKNESS |
|---|---|---|
| SUBSTRATE (REFRACTIVE INDEX: 1.49) | | |
| 1 | $Ta_2O_5$ | 0.14 |
| 2 | $SiO_2$ | 0.67 |
| 3 | $Ta_2O_5$ | 0.41 |
| 4 | $SiO_2$ | 0.44 |
| 5 | $Ta_2O_5$ | 0.73 |
| 6 | $SiO_2$ | 0.20 |
| 7 | $Ta_2O_5$ | 1.24 |
| 8 | $SiO_2$ | 0.15 |
| 9 | $Ta_2O_5$ | 0.82 |
| 10 | $SiO_2$ | 0.44 |
| 11 | $Ta2O_5$ | 0.36 |
| 12 | $MgF_2$ | 1.25 |
| 13 | $SiO_2$ | 0.03 |
| AIR | | |

ANTIREFLECTION COATING, OPTICAL SYSTEM, AND OPTICAL INSTRUMENT

CROSS-REFERENCE TO RELATED APPLICATION

The present application is based upon and claims the benefit of priority from the prior Japanese Patent Application No. 2011-130083 filed on Jun. 10, 2011; the entire contents of which are incorporated herein by reference.

TECHNICAL FIELD

The present invention relates to an antireflection coating, an optical system having the antireflection coating, and an optical instrument having the optical system.

BACKGROUND ART

In recent years, applications of fluorescence microscopes have been increasing in the field of medical care and chemistry. In the fluorescence microscopes, by giving a reagent containing a fluorescent protein to an object to be observed and irradiating the object with light of a certain wavelength, fluorescent light having a different wavelength is emitted from the reagent and the fluorescent light is used for observations of cells etc. As an example of such a fluorescence microscope, a multiphoton absorption microscope is named.

The multiphoton absorption microscope uses high order, e.g. second order, of laser beam as excitation light in order to achieve high power output. Thus, the wavelength of laser beam is in the infrared range for visible light observation by the excitation.

Therefore, it is necessary for an optical system in the multiphoton absorption microscope to transmit fluorescent light (visible light) for observation as well as near infrared light of excitation laser beam for generating the fluorescent light. For this reason, an antireflection coating able to transmit from visible light to near infrared light is needed. As the excitation light, light having a wavelength approximately twice of the fluorescent observation wavelength is needed. In fluorescent observation, the wavelength used for observation is determined by the reagent used. Since the wavelength used for observation is approximately 500 nm, it is required for the optical system to transmit light in the wavelength range up to near infrared (approximately 1000 nm).

Commonly known antireflection coatings are adapted to transmit visible light (in the wavelength range of 400 nm to 680 nm). Non-patent literature 1 describes a design of a three-layer antireflection coating. Patent literature 1 discloses an antireflection coating for near infrared light not including visible light. In cases where visible light is used, light in the near infrared wavelength range is blocked in many cases. For this reason, an antireflection coating that transmits visible light and reflects near infrared light has been proposed as disclosed in patent literature 2. As an antireflection coating for visible light and near infrared light, an antireflection coating that transmits light in the wavelength range of 400 nm to 1100 nm is disclosed in patent literature 3.

CITATION LIST

Patent Literature

Patent Literature 1: Japanese Patent Application Laid-Open No. 2005-275294

Patent Literature 2: Japanese Patent Application Laid-Open No. 9-325211

Patent Literature 3: Japanese Patent Application Laid-Open No. 2005-338366

Non Patent Literature

Non-patent Literature 1: H. A. Macleod, 'Thin Film Optical Filters' Pages 129-130, December, 1989, Nikkan Kogyo Shinbunsha Shuppan

SUMMARY OF INVENTION

Technical Problem

By development of new reagents adapted to objects to be observed, the wavelength range that can be used in fluorescent observation is being extended to cover the entire visible wavelength range. To enable fluorescent observation throughout the entire visible wavelength range, an optical system that can transmit visible light (from 400 nm to 680 nm) and excitation laser light (from 800 nm to 1350 nm) is needed. In other words, the optical system needs to have a transmission band ranging from 400 nm to 1350 nm, namely a transmission band having a width almost twice as large as the width of the visible light wavelength range.

FIG. 26 is a diagram showing the basic construction of a conventional multiphoton absorption microscope.

In the multiphoton absorption microscope shown in FIG. 26, short pulse laser light generated by a laser source 501 is reflected by a multi-layer filter 502 and delivered to an object S to be observed set on an observation table 503. Light generated in the object S to be observed by irradiation with the laser light is transmitted through the multi-layer filter 502 to allow observation by an observer B. It is required for the multi-layer filter 502, in its characteristics, to transmit light generated in the object S to be observed to allow observation in the visible wavelength range, and not to cause an increase in the pulse width in a reflection band which includes the wavelength of the short pulse laser light.

In the multiphoton absorption microscope shown in FIG. 26, it is necessary that the objective lens for observation have an antireflection coating for the wavelength range of 400 nm to 1350 nm. It is desirable that the antireflection coating be able to transmit light having a wavelength up to 1600 nm, taking into consideration peripheral applications used to facilitate observation. However, antireflection coatings disclosed in non-patent literature 1 and patent literature 1 can transmit only one of visible light and near infrared light. On the other hand, the width of the transmission band of the antireflection coating disclosed in patent literature 3 is not large enough, and its reflectance is 7% at wavelength of 1350 nm and 16% at wavelength of 1600 nm, which are higher than the reflectance of the lens and the substrate. Therefore, it cannot serve as an antireflection coating.

The present invention has been made in view of the above-described problems, and an object of the present invention is to provide an antireflection coating having an effective antireflection band at least ranging from visible light to near infrared light (wavelength range of 400 nm to 1350 nm).

Solution to Problem

To solve the above problems and to achieve the object, there is provided according to the present invention an antireflection coating characterized by comprising an deposited structure made up of twelve layers in which layers of a high refractive index material having a refractive index nH of 1.95 to 2.32 and layers of a low refractive index material having a refractive index of 1.35 to 1.46 are deposited alternately, wherein the reflectance of the antireflection coating is not higher than 1.5% in the wavelength range of 400 nm to 680 nm and not higher than 2.0% in the wavelength range of 680 nm to 1350 nm.

In the antireflection coating according to the present invention, it is preferred that the high refractive index layers be arranged as first, third, fifth, seventh, ninth, and eleventh layers, the low refractive index layers be arranged as second, fourth, sixth, eighth, tenth, and twelfth layers, where the layers are numbered in order from the side of a substrate on which the deposited structure is formed, and the optical layer thickness, which is defined as the product of the refractive index and the physical film thickness d, of layers in the deposited structure satisfy the following conditions respectively:

1st layer: $0.11 < nHd < 0.25$,
2nd layer: $0.33 < nLd < 0.72$,
3rd layer: $0.33 < nHd < 0.60$,
4th layer: $0.23 < nLd < 0.54$,
5th layer: $0.63 < nHd < 0.88$,
6th layer: $0.08 < nLd < 0.22$,
7th layer: $1.23 < nHd < 2.29$,
8th layer: $0.06 < nLd < 0.15$,
9th layer: $0.59 < nHd < 0.94$,
10th layer: $0.34 < nLd < 0.44$,
11th layer: $0.23 < nHd < 0.42$, and
12th layer: $1.15 < nLd < 1.27$.

In the antireflection coating according to the present invention, it is preferred that the high refractive index material be $TiO_2$, $Nb_2O_5$, $Ta_2O_5$, $HfO_2$, or a mixture of these materials with La and/or Zr, and the low refractive index material be $SiO_2$, $MgF_2$, or a mixture of $SiO_2$ and $MgF_2$.

In the antireflection coating according to the present invention, it is preferred that the refractive index of the substrate be in the range from 1.48 to 1.8.

An optical system according to the present invention comprises two or more substrates on which an antireflection coating according to the present invention is formed.

An optical instrument according to the present invention comprises an optical system according to the present invention.

Advantageous Effects of Invention

The antireflection coating according to the present invention is advantageous in enabling to provide an optical system transmitting visible light and excitation light having a wavelength approximately twice as long as the wavelength of the visible light, thereby enabling a fluorescent observation over the entire visible wavelength range.

BRIEF DESCRIPTION OF DRAWINGS

FIG. 2 is a table showing specifications of the layer structure of antireflection coatings according to examples 1, 2, and 3;

FIG. 4 is a table showing the average reflectance and the maximum reflectance of the antireflection coatings according to examples 1, 2, and 3;

FIG. 7 is a table showing specifications of the layer structure of antireflection coatings according to examples 4, 5, and 6;

FIG. 9 is a table showing the average reflectance and the maximum reflectance of the antireflection coatings according to examples 4, 5, and 6;

FIG. 12 is a table showing specifications of the layer structure of antireflection coatings according to examples 7, 8, and 9;

FIG. 14 is a table showing the average reflectance and the maximum reflectance of the antireflection coatings according to examples 7, 8 and 9;

FIG. 17 is a table showing specifications of the layer structure of an antireflection coating according to example 10;

FIG. 19 is a table showing the average reflectance and the maximum reflectance of the antireflection coatings according to examples 10, 11, 12 and 13;

FIG. 20 is a table showing specifications of the layer structure of the antireflection coating according to example 11;

FIG. 22 is a table showing specifications of the layer structure of the antireflection coating according to example 12;

FIG. 24 is a table showing specifications of the layer structure of the antireflection coating according to example 13;

DESCRIPTION OF EMBODIMENTS

In the following, embodiments of the antireflection coating, optical system, and optical instrument according to the present invention will be described in detail with reference to the drawings. The present invention is not limited by the embodiments described in the following.

Figure 1:
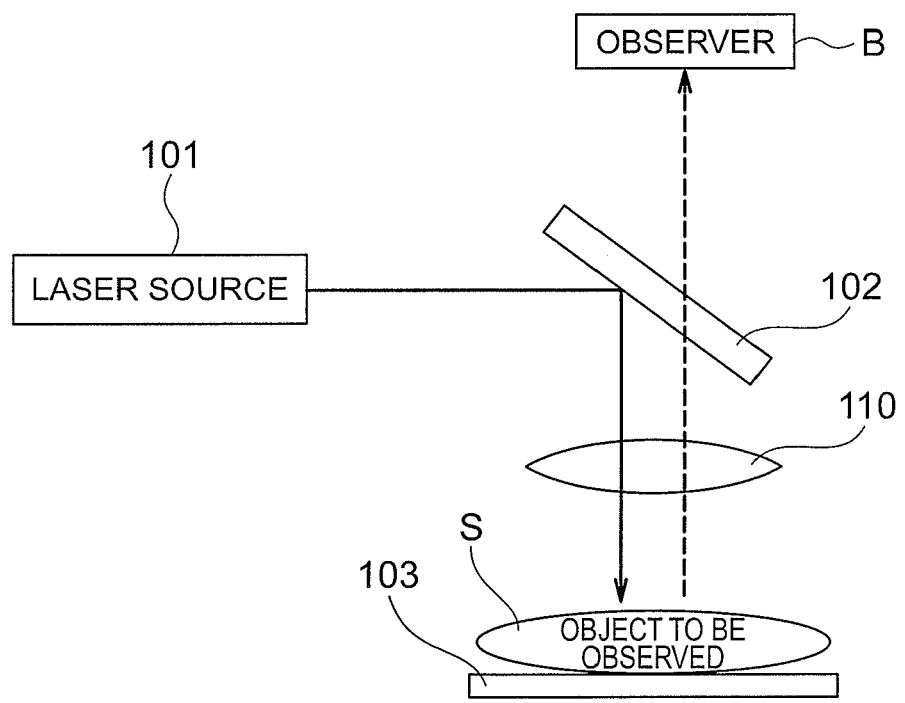
FIG. 1 is a diagram showing the basic construction of a multiphoton absorption microscope according to an embodiment of the present invention.

FIG. 1 is a diagram showing the basic construction of a multiphoton absorption microscope as an embodiment of the optical instrument according to the present invention.

In the multiphoton absorption microscope shown in FIG. 1, short pulse laser light generated by a laser source 101 is reflected by a multi-layer filter 102 and delivered to an objects S to be observed set on an observation table 103 through an optical system 110 having an antireflection coating according to the embodiment. Light generated in the object S to be observed by irradiation with the laser light is transmitted through the multi-layer filter 102 to allow observation by an observer B.

Next, the construction, operation, and advantageous effects of the antireflection coating in this embodiment will be described. The antireflection coating in this embodiment is characterized in having a reflectance not higher than 1.5% in the wavelength range of 400 nm to 680 nm and not higher than 2.0% in the wavelength range of 680 nm to 1350 nm.

With this antireflection coating, it is possible to provide an optical system that transmits visible light and excitation light having a wavelength twice as long as that of the visible light, enabling fluorescent observation over the entire visible wavelength range.

Since the intensity of light generated in the visible wavelength range (wavelength range of 400 nm to 680 nm) is low, it is preferred that the reflectance be not higher than 1.5%, more preferably not higher than 1%, in order to make the loss of transmitted light as small as possible.

On the other hand, the intensity of the laser light in the wavelength range of 680 nm to 1350 nm used as the excitation light is very high, it is preferred for an appropriate antireflection effect that the reflectance be not higher than 5%, more preferably no higher than 2%, still more preferably not higher than 1.5%.

The antireflection coating according to this embodiment has a deposition structure made up of twelve layers in which layers of a high refractive index material having an refractive index nH in the range of 1.95 to 2.32 and layers of a low refractive index material having a refractive index nL in the range of 1.35 to 1.46 are deposited alternately. The first, third, fifth, seventh, ninth, and eleventh layers are high refractive index layers, and the second, fourth, sixth, eighth, tenth, and twelfth layers are low refractive index layers, where the layers are numbered in order from the side of a substrate on which the deposited structure is formed. It is preferred that the optical layer thickness, which is defined as the product of the refractive index and the physical thickness D, of the layers in the deposited structure satisfy the following conditions respectively:

1st layer: $0.11<nHd<0.25$,
2nd layer: $0.33<nLd<0.72$,
3rd layer: $0.33<nHd<0.60$,
4th layer: $0.23<nLd<0.54$,
5th layer: $0.63<nHd<0.88$,
6th layer: $0.08<nLd<0.22$,
7th layer: $1.23<nHd<2.29$,
8th layer: $0.06<nLd<0.15$,
9th layer: $0.59<nHd<0.94$,
10th layer: $0.34<nLd<0.44$,
11th layer: $0.23<nHd<0.42$, and
12th layer: $1.15<nLd<1.27$.

In the antireflection coating according to this embodiment, it is preferred that the high refractive index material be $TiO_2$, $Nb_2O_5$, $Ta_2O_5$, $HfO_2$, or a mixture of these materials with La and/or Zr and that the low refractive index material be $SiO_2$, $MgF_2$, or a mixture of $SiO_2$ and $MgF_2$.

In the antireflection coating according to this embodiment, it is preferred that the refractive index of the substrate be in the range of 1.48 to 1.8.

The optical system according to this embodiment is characterized by including two or more substrates on which the antireflection coating according to the embodiment is formed.

The optical instrument according to the embodiment is characterized by including the above-described optical system according to the embodiment.

It is not necessary that each of the high refractive index material and the low refractive index material be one kind of material. For example, the second layer and the fourth layer may be made of low refractive index materials different in kind from each other. The coating method may be, but not limited to, vacuum deposition, IAD, plasma assisted deposition, sputtering, ion beam sputtering, spin coating, or dipping.

It is preferred that the antireflection coating according to the embodiment be applied on an objective lens of a microscope, but it can also be applied to lenses, prism, or filers of cameras, eyeglasses, and telescopes etc. The optical instrument according to the embodiment of the present invention is, for example, one of these optical instruments listed above, and the optical system according to the embodiment is, for example, the optical system with which one of these instruments is equipped.

Examples 1 to 3

Figure 3:
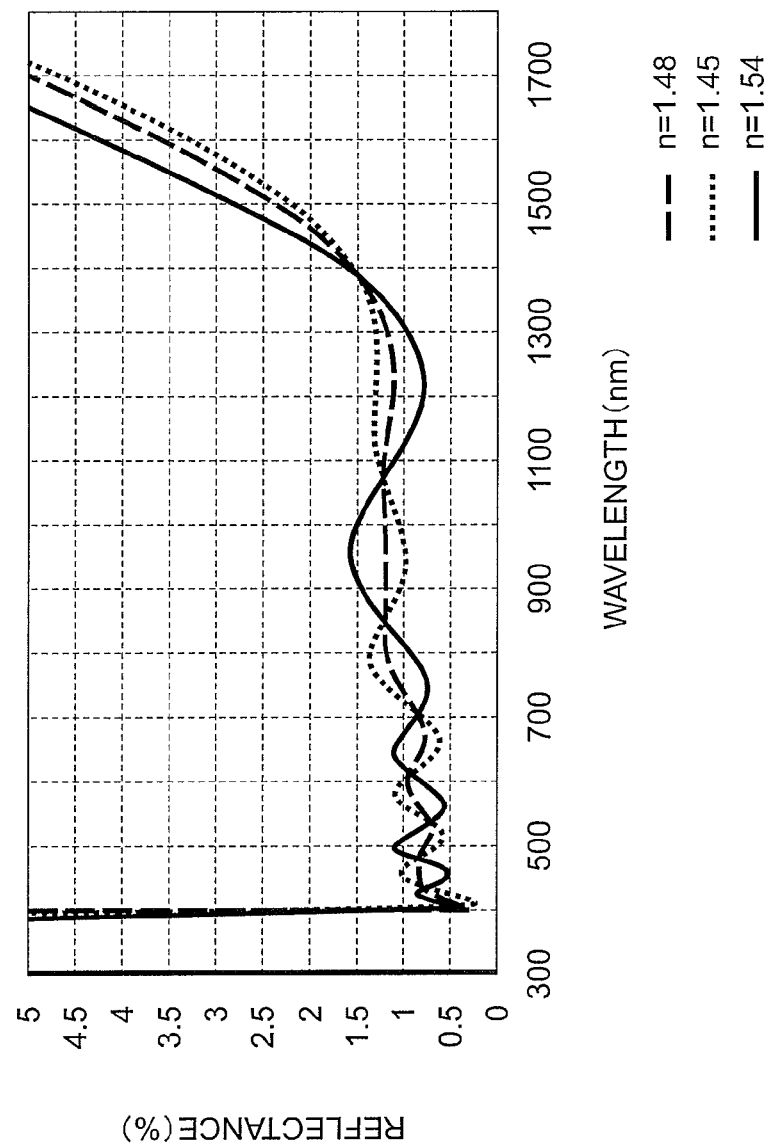
FIG. 3 is a graph showing reflectance characteristics of the antireflection coating according to example 1.
Figure 5:
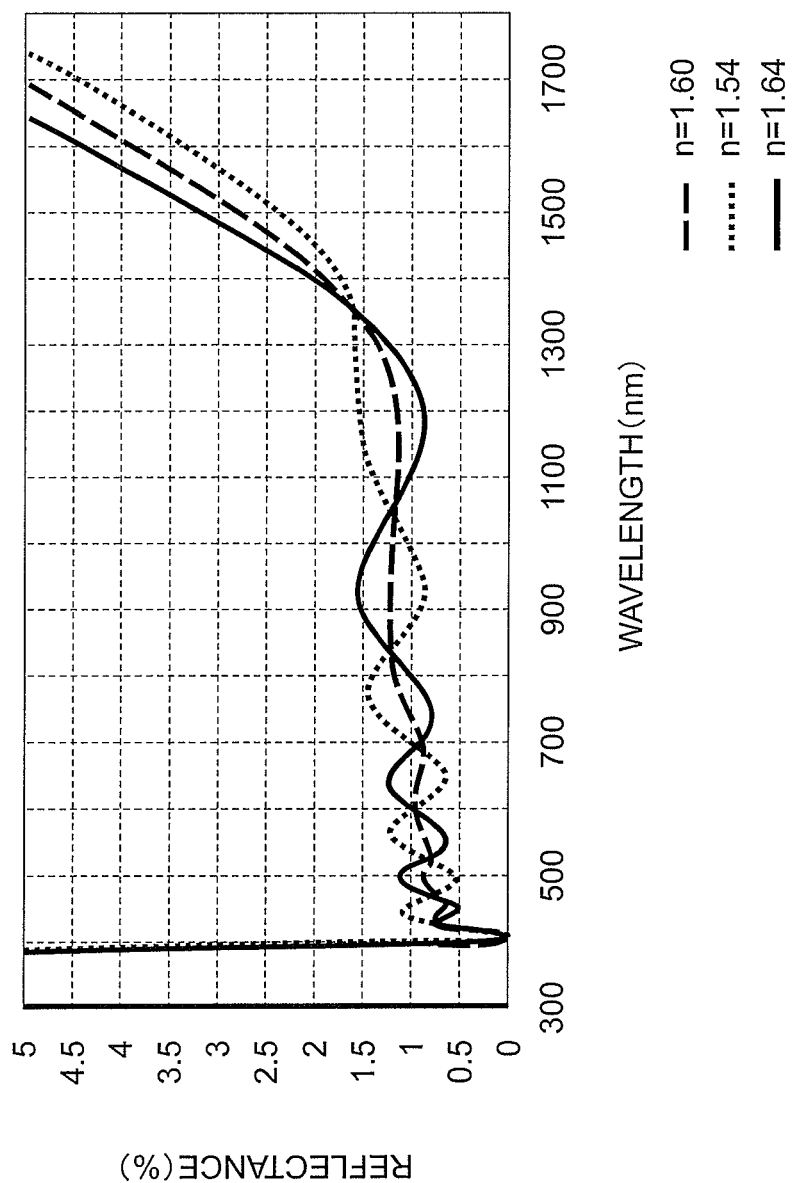
FIG. 5 is a graph showing reflectance characteristics of the antireflection coating according to example 2.
Figure 6:
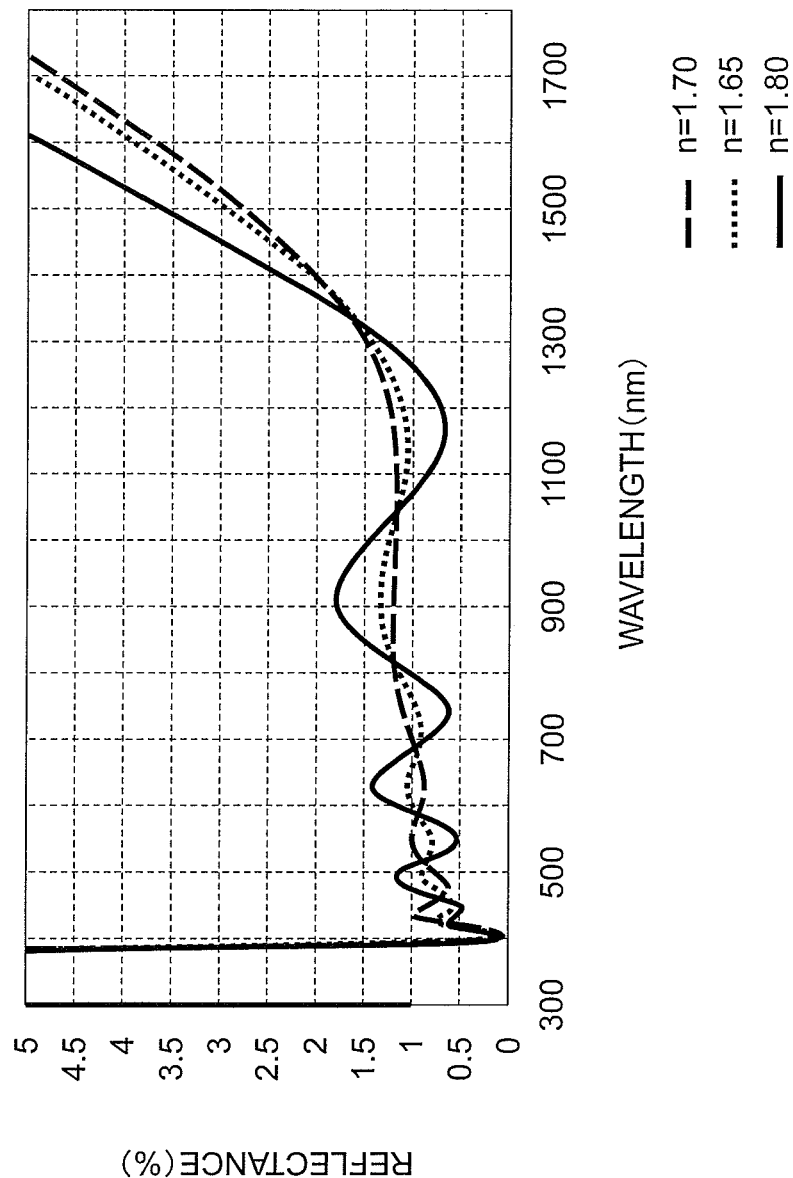
FIG. 6 is a graph showing reflectance characteristics of the antireflection coating according to example 3.

FIG. 2 is a table showing specifications of the layer structure of antireflection coatings according to examples 1, 2, and 3. FIG. 3 is a graph showing reflectance characteristics of the antireflection coating according to example 1. FIG. 4 is a table showing the average reflectance and the maximum reflectance of the antireflection coatings according to examples 1, 2, and 3. FIG. 5 is a graph showing reflectance characteristics of the antireflection coating according to example 2. FIG. 6 is a graph showing reflectance characteristics of the antireflection coating according to example 3.

FIG. 2 shows the optical layer thickness of the layers. In FIG. 3, the broken curve, the dotted curve, and the solid curve represent the reflectance in cases where the refractive index n of the substrate is 1.48, 1.45, and 1.54 respectively. In FIG. 5, the broken curve, the dotted curve, and the solid curve represent the reflectance in cases where the refractive index n of the substrate is 1.60, 1.54, and 1.64 respectively. In FIG. 6, the broken curve, the dotted curve, and the solid curve represent the reflectance in cases where the refractive index n of the substrate is 1.70, 1.65, and 1.80 respectively.

FIG. 4 shows the average reflectance and the maximum reflectance with the substrates mentioned above in connection with FIGS. 3, 5, and 6.

As shown in FIG. 2, the antireflection coatings according to examples 1 to 3 have a deposition structure made up of twelve layers in which layers of $HfO_2$ (having a refractive index nH of 1.99) as a high refractive index material and layers of $SiO_2$ (having a refractive index nL of 1.45) or $MgF_2$ (having a refractive index nL of 1.38) as a low refractive index material are deposited alternately. The layers of $HfO_2$ as a high refractive index material are arranged as the first, third, fifth, seventh, ninth, and eleventh layers. Here, the layers are numbered in order from the side of the substrate. The layers of $SiO_2$ as a low refractive index material are arranged as the second, fourth, sixth, eighth, and tenth layers. The layer of $MgF_2$ as a low refractive index material is arranged as the twelfth layer (the outermost layer).

The optical layer thickness, which is defined as the product of the refractive index nH, nL and the physical thickness D, of the each layers in the deposition structure satisfies the following conditions respectively. Here, the optical layer thickness is expressed in a unit where a quarter of design wavelength is expressed as 1.00 at the design wavelength of 550 nm.

1st layer: $0.11 < nHd < 0.25$,
2nd layer: $0.33 < nLd < 0.72$,
3rd layer: $0.33 < nHd < 0.60$,
4th layer: $0.23 < nLd < 0.54$,
5th layer: $0.63 < nHd < 0.88$,
6th layer: $0.08 < nLd < 0.22$,
7th layer: $1.23 < nHd < 2.29$,
8th layer: $0.06 < nLd < 0.15$,
9th layer: $0.59 < nHd < 0.94$,
10th layer: $0.34 < nLd < 0.44$,
11th layer: $0.23 < nHd < 0.42$,
12th layer: $1.15 < nLd < 1.27$.

Example 1

As shown in FIGS. 3 and 4, the antireflection coating according to example 1 has a reflectance lower than 1.5% in the wavelength range of 400 nm to 680 nm and lower than 2.0% in the wavelength range of 680 nm to 1350 nm, with any substrate having a refractive index falling in the range of 1.45 to 1.54.

Specifically, as shown in FIG. 4, in the case where the antireflection coating is formed on a substrate having a refractive index of 1.48, the maximum reflectance is 0.93% and the average reflectance is 0.78% in the wavelength range of 400 nm to 680 nm, and the maximum reflectance is 1.33% and the average reflectance is 1.15% in the wavelength range of 680 nm to 1350 nm.

In the case where the antireflection coating is formed on a substrate having a refractive index of 1.45, the maximum reflectance is 1.09% and the average reflectance is 0.78% in the wavelength range of 400 nm to 680 nm, and the maximum reflectance is 1.39% and the average reflectance is 1.19% in the wavelength range of 680 nm to 1350 nm.

In the case where the antireflection coating is formed on a substrate having a refractive index of 1.54, the maximum reflectance is 1.11% and the average reflectance is 0.83% in the wavelength range of 400 nm to 680 nm, and the maximum reflectance is 1.57% and the average reflectance is 1.11% in the wavelength range of 680 nm to 1350 nm.

Example 2

As shown in FIGS. 4 and 5, the antireflection coating according to example 2 has a reflectance lower than 1.5% in the wavelength range of 400 nm to 680 nm and lower than 2.0% in the wavelength range of 680 nm to 1350 nm, with any substrate having a refractive index falling in the range of 1.54 to 1.64.

Specifically, as shown in FIG. 4, in the case where the antireflection coating is formed on a substrate having a refractive index of 1.60, the maximum reflectance is 0.98% and the average reflectance is 0.82% in the wavelength range of 400 nm to 680 nm, and the maximum reflectance is 1.59% and the average reflectance is 1.20% in the wavelength range of 680 nm to 1350 nm.

In the case where the antireflection coating is formed on a substrate having a refractive index of 1.54, the maximum reflectance is 1.24% and the average reflectance is 0.82% in the wavelength range of 400 nm to 680 nm, and the maximum reflectance is 1.66% and the average reflectance is 1.30% in the wavelength range of 680 nm to 1350 nm.

In the case where the antireflection coating is formed on a substrate having a refractive index of 1.64, the maximum reflectance is 1.23% and the average reflectance is 0.87% in the wavelength range of 400 nm to 680 nm, and the maximum reflectance is 1.58% and the average reflectance is 1.15% in the wavelength range of 680 nm to 1350 nm.

Example 3

As shown in FIGS. 4 and 6, the antireflection coating according to example 3 has a reflectance lower than 1.5% in the wavelength range of 400 nm to 680 nm and lower than 2.0% in the wavelength range of 680 nm to 1350 nm, with any substrate having a refractive index falling in the range of 1.65 to 1.80.

Specifically, as shown in FIG. 4, in the case where the antireflection coating is formed on a substrate having a refractive index of 1.70, the maximum reflectance is 1.02% and the average reflectance is 0.85% in the wavelength range of 400 nm to 680 nm, and the maximum reflectance is 1.73% and the average reflectance is 1.25% in the wavelength range of 680 nm to 1350 nm.

In the case where the antireflection coating is formed on a substrate having a refractive index of 1.65, the maximum reflectance is 1.07% and the average reflectance is 0.86% in the wavelength range of 400 nm to 680 nm, and the maximum reflectance is 1.73% and the average reflectance is 1.22% in the wavelength range of 680 nm to 1350 nm.

In the case where the antireflection coating is formed on a substrate having a refractive index of 1.80, the maximum reflectance is 1.45% and the average reflectance is 0.93% in the wavelength range of 400 nm to 680 nm, and the maximum reflectance is 1.84% and the average reflectance is 1.17% in the wavelength range of 680 nm to 1350 nm.

Examples 4 to 6

Figure 8:
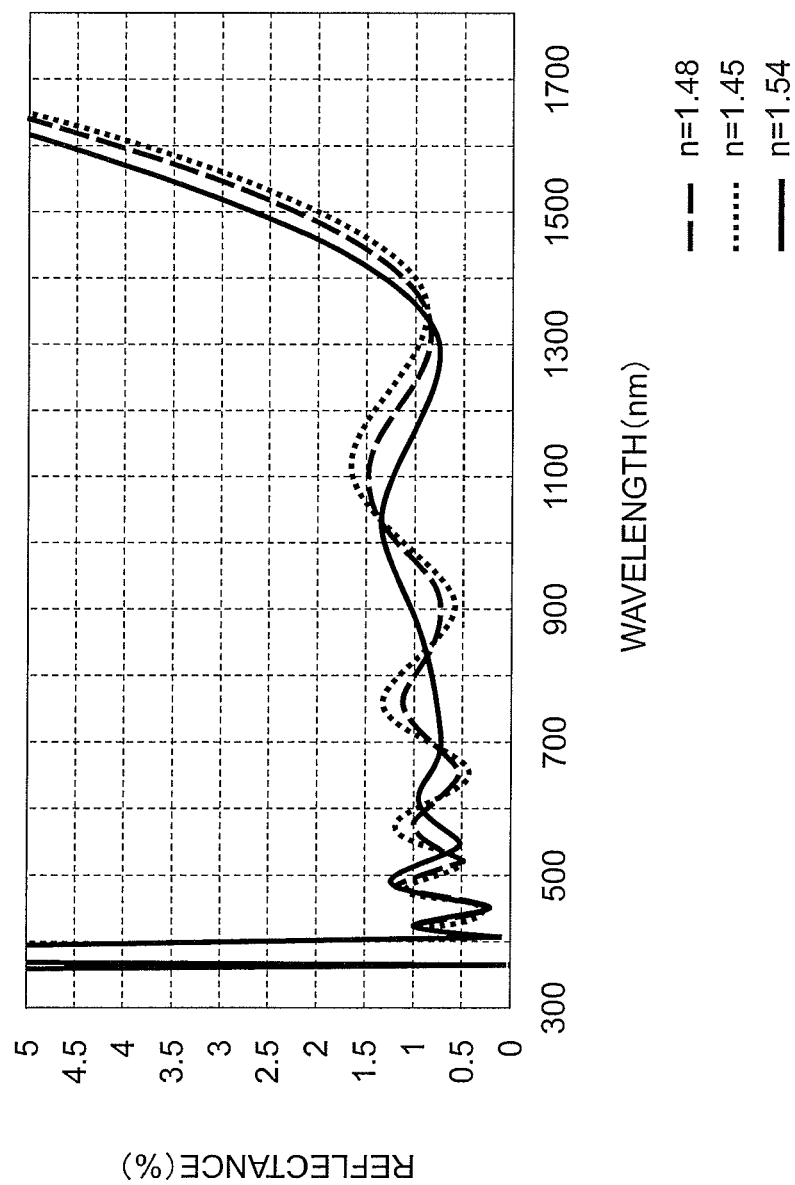
FIG. 8 is a graph showing reflectance characteristics of the antireflection coating according to example 4.
Figure 10:
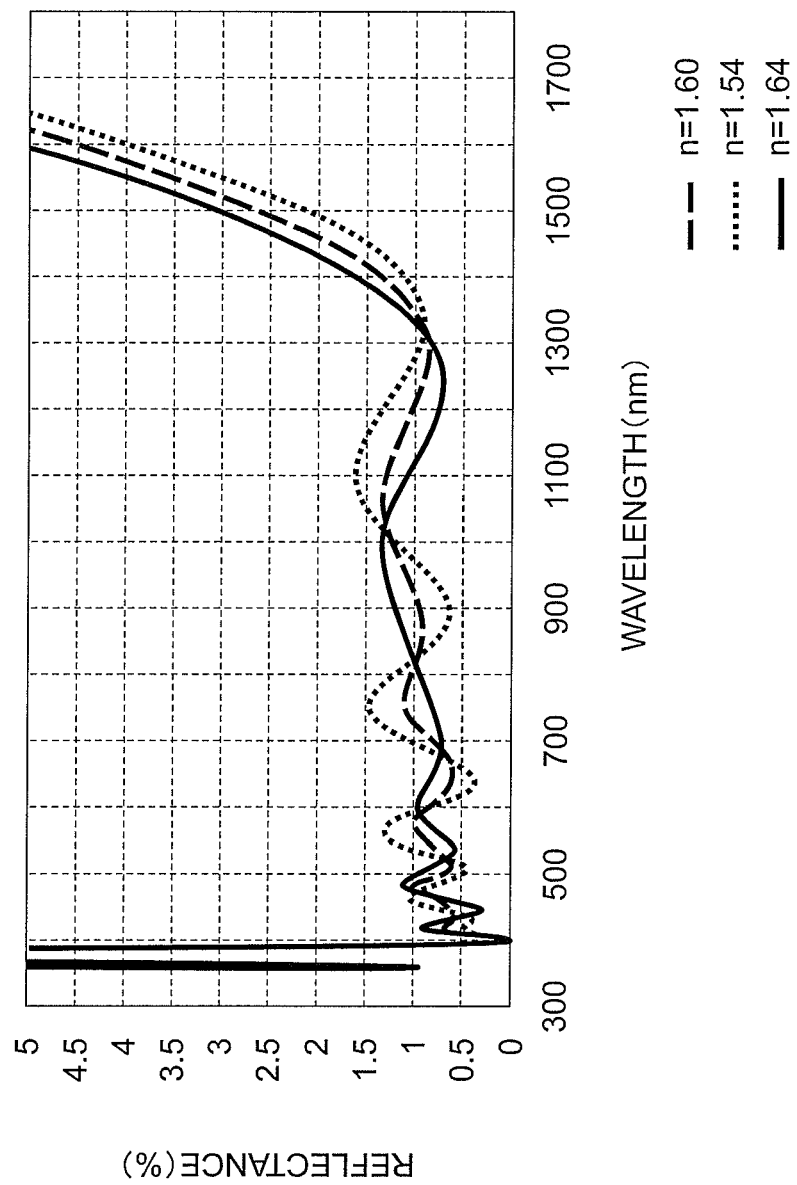
FIG. 10 is a graph showing reflectance characteristics of the antireflection coating according to example 5.
Figure 11:
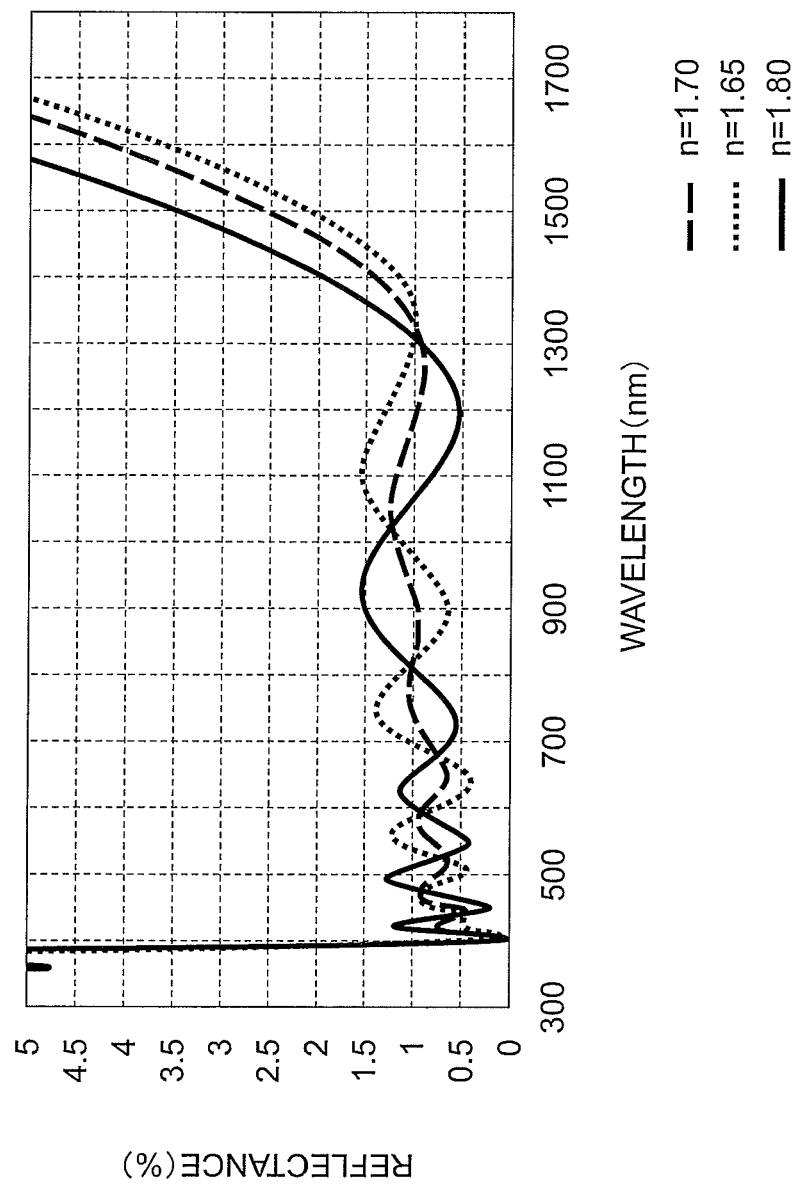
FIG. 11 is a graph showing reflectance characteristics of the antireflection coating according to example 6.

FIG. 7 is a table showing specifications of the layer structure of antireflection coatings according to examples 4, 5, and 6. FIG. 8 is a graph showing reflectance characteristics of the antireflection coating according to example 4. FIG. 9 is a table showing the average reflectance and the maximum reflectance of the antireflection coatings according to examples 4, 5, and 6. FIG. 10 is a graph showing reflectance characteristics of the antireflection coating according to example 5. FIG. 11 is a graph showing reflectance characteristics of the antireflection coating according to example 6.

FIG. 7 shows the optical layer thickness of the each layers. In FIG. 8, the broken curve, the dotted curve, and the solid curve represent the reflectance in cases where the refractive index n of the substrate is 1.48, 1.45, and 1.54 respectively. In FIG. 10, the broken curve, the dotted curve, and the solid curve represent the reflectance in cases where the refractive index n of the substrate is 1.60, 1.54, and 1.64 respectively. In FIG. 11, the broken curve, the dotted curve, and the solid curve represent the reflectance in cases where the refractive index n of the substrate is 1.70, 1.65, and 1.80 respectively. FIG. 9 shows the average reflectance and the maximum reflectance with the substrates mentioned above in connection with FIGS. 8, 10, and 11.

As shown in FIG. 7, the antireflection coatings according to examples 4 to 6 have a deposition structure made up of twelve layers in which layers of $TiO_2$ (having a refractive index niI of 2.22) as a high refractive index material and layers of MgF$_2$ (having a refractive index nL of 1.38) as a low refractive index material are deposited alternately. The layers of TiO$_2$ as a high refractive index material are arranged as the first, third, fifth, seventh, ninth, and eleventh layers. Here, the layers are numbered in order from the side of the substrate. The layers of MgF$_2$ as a low refractive index material are arranged as the second, fourth, sixth, eighth, tenth, and twelfth layers.

The optical layer thickness, which is defined as the product of the refractive index nH, nL and the physical thickness D, of the layers in the deposition structure satisfies the following conditions respectively. Here, the optical layer thickness is expressed in a unit where a quarter of design wavelength is expressed as 1.00 at the design wavelength of 550 nm.

1st layer: 0.11<nHd<0.25,
2nd layer: 0.33<nLd<0.72,
3rd layer: 0.33<nHd<0.60,
4th layer: 0.23<nLd<0.54,
5th layer: 0.63<nHd<0.88,
6th layer: 0.08<nLd<0.22,
7th layer: 1.23<nHd<2.29,
8th layer: 0.06<nLd<0.15,
9th layer: 0.59<nHd<0.94,
10th layer: 0.34<nLd<0.44,
11th layer: 0.23<nHd<0.42,
12th layer: 1.15<nLd<1.27.

Example 4

As shown in FIGS. 8 and 9, the antireflection coating according to example 4 has a reflectance lower than 1.5% in the wavelength range of 400 nm to 680 nm and lower than 2.0% in the wavelength range of 680 nm to 1350 nm, with any substrate having a refractive index falling in the range of 1.45 to 1.54.

Specifically, as shown in FIG. 9, in the case where the antireflection coating is formed on a substrate having a refractive index of 1.48, the maximum reflectance is 1.04% and the average reflectance is 0.69% in the wavelength range of 400 nm to 680 nm, and the maximum reflectance is 1.47% and the average reflectance is 1.05% in the wavelength range of 680 nm to 1350 nm.

In the case where the antireflection coating is formed on a substrate having a refractive index of 1.45, the maximum reflectance is 1.17% and the average reflectance is 0.69% in the wavelength range of 400 nm to 680 nm, and the maximum reflectance is 1.65% and the average reflectance is 1.12% in the wavelength range of 680 nm to 1350 nm.

In the case where the antireflection coating is formed on a substrate having a refractive index of 1.54, the maximum reflectance is 1.23% and the average reflectance is 0.75% in the wavelength range of 400 nm to 680 nm, and the maximum reflectance is 1.33% and the average reflectance is 0.97% in the wavelength range of 680 nm to 1350 nm.

Example 5

As shown in FIGS. 9 and 10, the antireflection coating according to example 5 has a reflectance lower than 1.5% in the wavelength range of 400 nm to 680 nm and lower than 2.0% in the wavelength range of 680 nm to 1350 nm, with any substrate having a refractive index falling in the range of 1.54 to 1.64.

Specifically, as shown in FIG. 9, in the case where the antireflection coating is formed on a substrate having a refractive index of 1.60, the maximum reflectance is 0.98% and the average reflectance is 0.72% in the wavelength range of 400 nm to 680 nm, and the maximum reflectance is 1.33% and the average reflectance is 1.05% in the wavelength range of 680 nm to 1350 nm.

In the case where the antireflection coating is formed on a substrate having a refractive index of 1.54, the maximum reflectance is 1.29% and the average reflectance is 0.71% in the wavelength range of 400 nm to 680 nm, and the maximum reflectance is 1.60% and the average reflectance is 1.16% in the wavelength range of 680 nm to 1350 nm.

In the case where the antireflection coating is formed on a substrate having a refractive index of 1.64, the maximum reflectance is 1.12% and the average reflectance is 0.76% in the wavelength range of 400 nm to 680 nm, and the maximum reflectance is 1.32% and the average reflectance is 1.00% in the wavelength range of 680 nm to 1350 nm.

Example 6

As shown in FIGS. 9 and 11, the antireflection coating according to example 6 has a reflectance lower than 1.5% in the wavelength range of 400 nm to 680 nm and lower than 2.0% in the wavelength range of 680 nm to 1350 nm, with any substrate having a refractive index falling in the range of 1.65 to 1.80.

Specifically, as shown in FIG. 9, in the case where the antireflection coating is formed on a substrate having a refractive index of 1.70, the maximum reflectance is 0.92% and the average reflectance is 0.71% in the wavelength range of 400 nm to 680 nm, and the maximum reflectance is 1.26% and the average reflectance is 1.05% in the wavelength range of 680 nm to 1350 nm.

In the case where the antireflection coating is formed on a substrate having a refractive index of 1.65, the maximum reflectance is 1.22% and the average reflectance is 0.70% in the wavelength range of 400 nm to 680 nm, and the maximum reflectance is 1.54% and the average reflectance is 1.15% in the wavelength range of 680 nm to 1350 nm.

In the case where the antireflection coating is formed on a substrate having a refractive index of 1.80, the maximum reflectance is 1.30% and the average reflectance is 0.83% in the wavelength range of 400 nm to 680 nm, and the maximum reflectance is 1.57% and the average reflectance is 0.99% in the wavelength range of 680 nm to 1350 nm.

Examples 7 to 9

Figure 13:
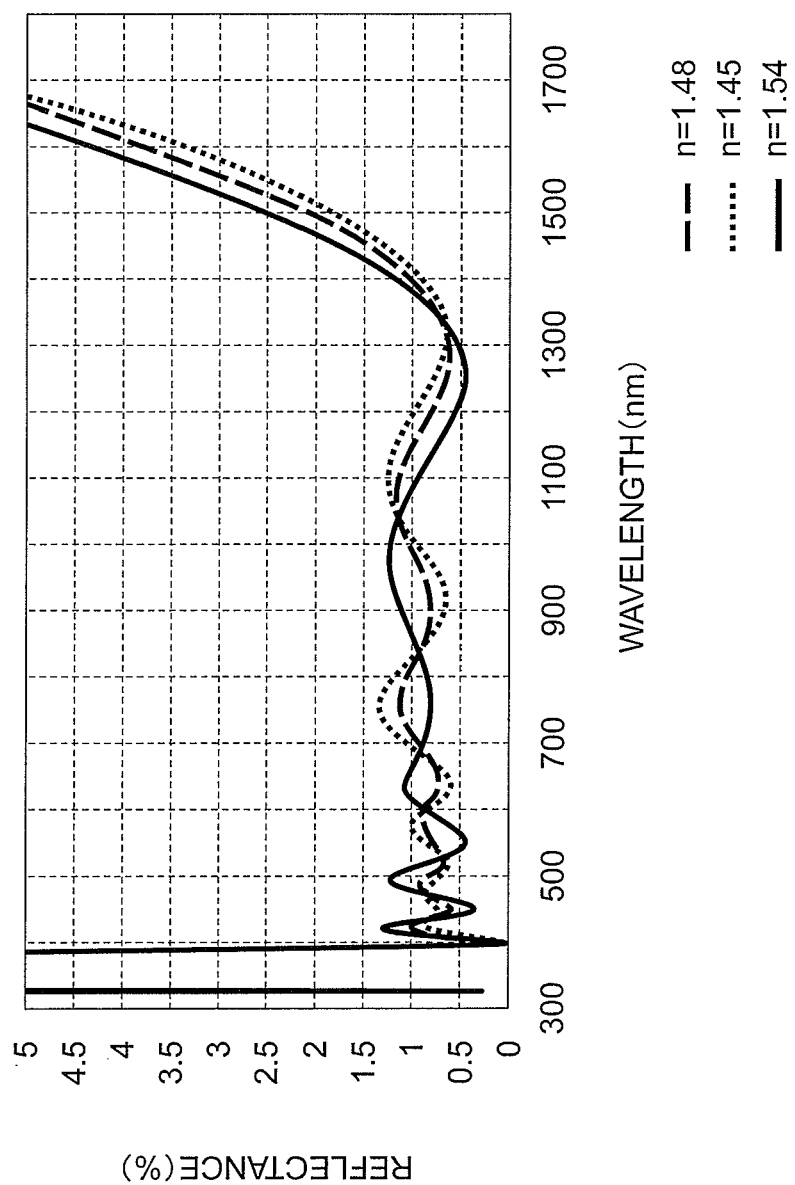
FIG. 13 is a graph showing reflectance characteristics of the antireflection coating according to example 7.
Figure 15:
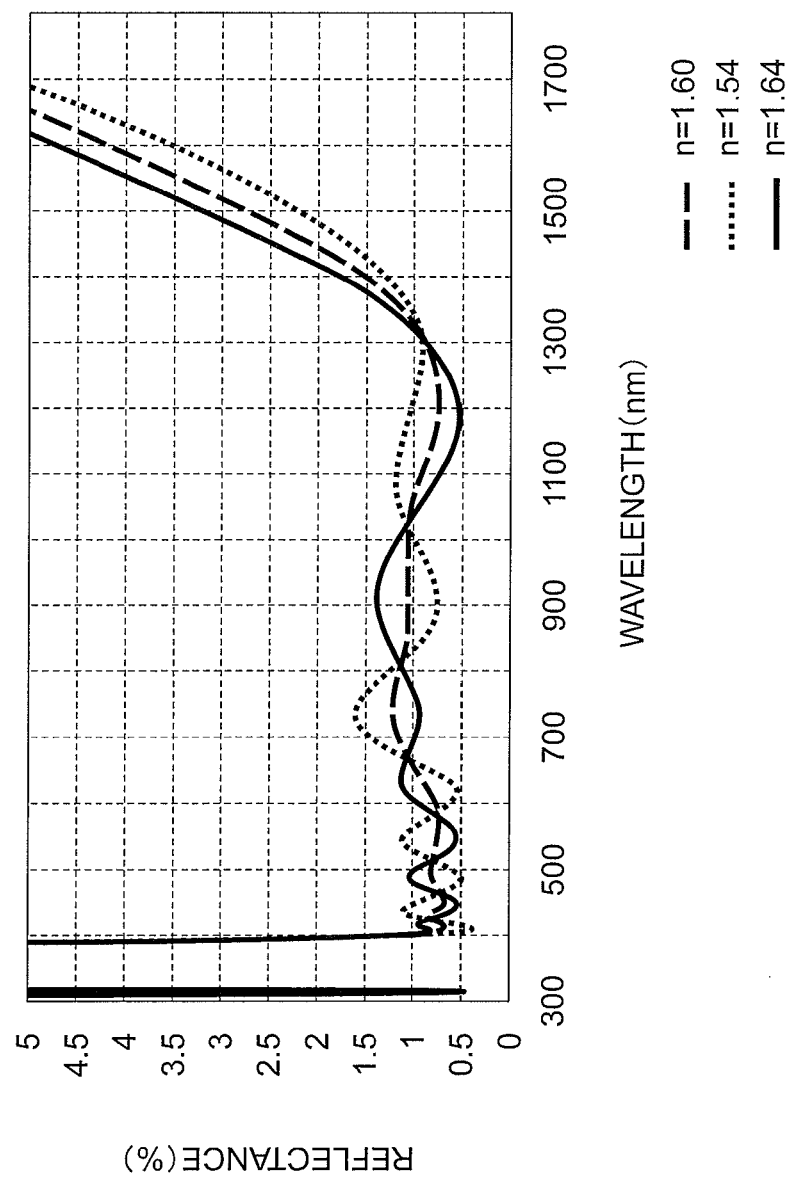
FIG. 15 is a graph showing reflectance characteristics of the antireflection coating according to example 8.
Figure 16:
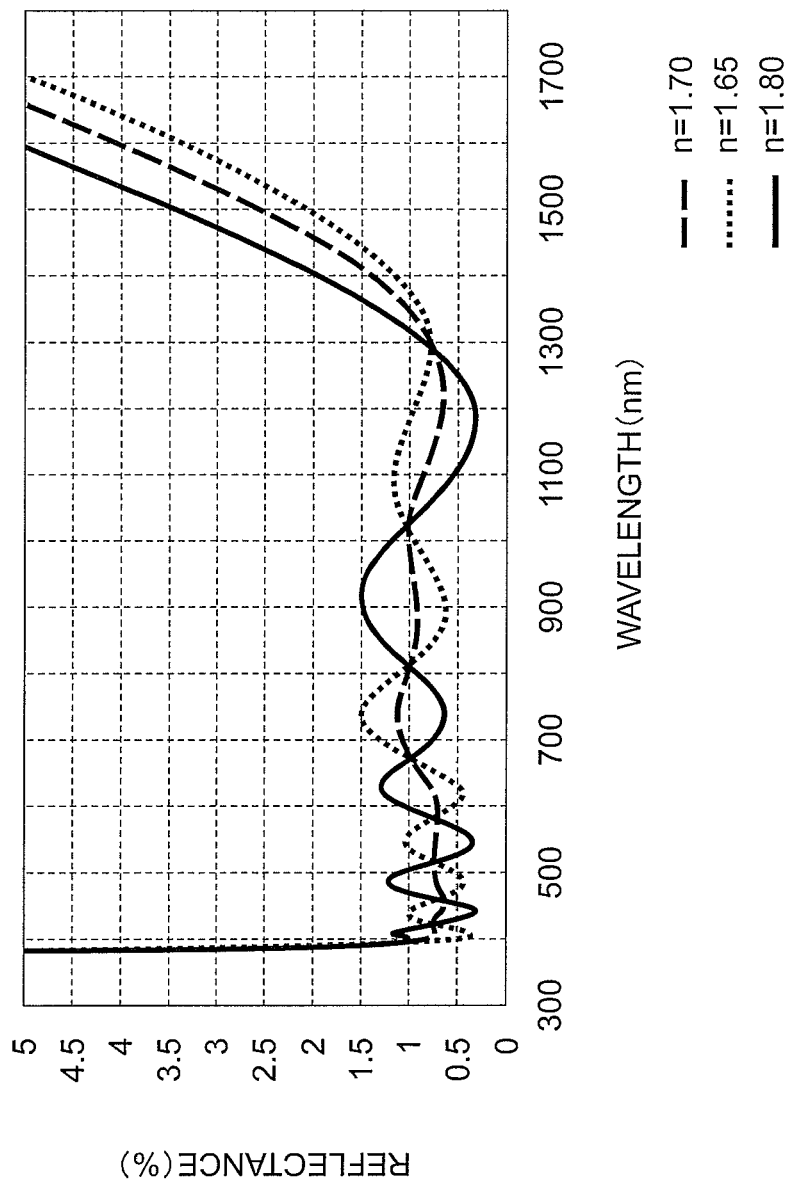
FIG. 16 is a graph showing reflectance characteristics of the antireflection coating according to example 9.

FIG. 12 is a table showing specifications of the layer structure of antireflection coatings according to examples 7, 8, and 9. FIG. 13 is a graph showing reflectance characteristics of the antireflection coating according to example 7. FIG. 14 is a table showing the average reflectance and the maximum reflectance of the antireflection coatings according to examples 7, 8 and 9. FIG. 15 is a graph showing reflectance characteristics of the antireflection coating according to example 8. FIG. 16 is a graph showing reflectance characteristics of the antireflection coating according to example 9.

FIG. 12 shows the optical layer thickness of the layers. In FIG. 33, the broken curve, the dotted curve, and the solid curve represent the reflectance in cases where the refractive index n of the substrate is 1.48, 1.45, and 1.54 respectively. In FIG. 15, the broken curve, the dotted curve, and the solid curve represent the reflectance in cases where the refractive index n of the substrate is 1.60, 1.54, and 1.64 respectively. In FIG. 16, the broken curve, the dotted curve, and the solid curve represent the reflectance in cases where the refractive index n of the substrate is 1.70, 1.65, and 1.80 respectively. FIG. 14 shows the average reflectance and the maximum reflectance with the substrates mentioned above in connection with FIGS. 13, 15, and 16.

As shown in FIG. 12, the antireflection coatings according to examples 7 to 9 have a deposition structure made up of twelve layers in which layers of $Ta_2O_5$ (having a refractive index nH of 2.22) as a high refractive index material and layers of $SiO_2$ (having a refractive index nL of 1.45) or $MgF_2$ (having a refractive index nL of 1.38) as a low refractive index material are deposited alternately. The layers of $Ta_2O_5$ as a high refractive index material are arranged as the first, third, fifth, seventh, ninth, and eleventh layers. Here, the layers are numbered in order from the side of the substrate. The layers of $SiO_2$ as a low refractive index material are arranged as the second, fourth, sixth, eighth, and tenth layers. The layer of $MgF_2$ as a low refractive index material is arranged as the twelfth layer.

The optical layer thickness, which is defined as the product of the refractive index nH, nL and the physical thickness D, of the layers in the deposition structure satisfies the following conditions respectively. Here, the optical layer thickness is expressed in a unit where a quarter of design wavelength is expressed as 1.00 at the design wavelength of 550 nm.

1st layer: $0.11 < nHd < 0.25$,
2nd layer: $0.33 < nLd < 0.72$,
3rd layer: $0.33 < nHd < 0.60$,
4th layer: $0.23 < nLd < 0.54$,
5th layer: $0.63 < nHd < 0.88$,
6th layer: $0.08 < nLd < 0.22$,
7th layer: $1.23 < nHd < 2.29$,
8th layer: $0.06 < nLd < 0.15$,
9th layer: $0.59 < nHd < 0.94$,
10th layer: $0.34 < nLd < 0.44$,
11th layer: $0.23 < nHd < 0.42$,
12th layer: $1.15 < nLd < 1.27$.

Example 7

As shown in FIGS. 13 and 14, the antireflection coating according to example 7 has a reflectance lower than 1.5% in the wavelength range of 400 nm to 680 nm and lower than 2.0% in the wavelength range of 680 nm to 1350 nm, with any substrate having a refractive index falling in the range of 1.45 to 1.54.

Specifically, as shown in FIG. 14, in the case where the antireflection coating is formed on a substrate having a refractive index of 1.48, the maximum reflectance is 0.97% and the average reflectance is 0.75% in the wavelength range of 400 nm to 680 nm, and the maximum reflectance is 1.13% and the average reflectance is 0.92% in the wavelength range of 680 nm to 1350 nm.

In the case where the antireflection coating is formed on a substrate having a refractive index of 1.45, the maximum reflectance is 0.98% and the average reflectance is 0.73% in the wavelength range of 400 nm to 680 nm, and the maximum reflectance is 1.35% and the average reflectance is 0.97% in the wavelength range of 680 nm to 1350 nm.

In the case where the antireflection coating is formed on a substrate having a refractive index of 1.54, the maximum reflectance is 1.31% and the average reflectance is 0.83% in the wavelength range of 400 nm to 680 nm, and the maximum reflectance is 1.23% and the average reflectance is 0.87% in the wavelength range of 680 nm to 1350 nm.

Example 8

As shown in FIGS. 14 and 15, the antireflection coating according to example 8 has a reflectance lower than 1.5% in the wavelength range of 400 nm to 680 nm and lower than 2.0% in the wavelength range of 680 nm to 1350 nm, with any substrate having a refractive index falling in the range of 1.54 to 1.64.

Specifically, as shown in FIG. 14, in the case where the antireflection coating is formed on a substrate having a refractive index of 1.60, the maximum reflectance is 1.11% and the average reflectance is 0.82% in the wavelength range of 400 nm to 680 nm, and the maximum reflectance is 1.23% and the average reflectance is 1.01% in the wavelength range of 680 nm to 1350 nm.

In the case where the antireflection coating is formed on a substrate having a refractive index of 1.54, the maximum reflectance is 1.22% and the average reflectance is 0.81% in the wavelength range of 400 nm to 680 nm, and the maximum reflectance is 1.63% and the average reflectance is 1.10% in the wavelength range of 680 nm to 1350 nm.

In the case where the antireflection coating is formed on a substrate having a refractive index of 1.64, the maximum reflectance is 1.15% and the average reflectance is 0.87% in the wavelength range of 400 nm to 680 nm, and the maximum reflectance is 1.39% and the average reflectance is 0.99% in the wavelength range of 680 nm to 1350 nm.

Example 9

As shown in FIGS. 14 and 16, the antireflection coating according to example 9 has a reflectance lower than 1.5% in the wavelength range of 400 nm to 680 nm and lower than 2.0% in the wavelength range of 680 nm to 1350 nm, with any substrate having a refractive index falling in the range of 1.65 to 1.80.

Specifically, as shown in FIG. 14, in the case where the antireflection coating is formed on a substrate having a refractive index of 1.70, the maximum reflectance is 1.01% and the average reflectance is 0.75% in the wavelength range of 400 nm to 680 nm, and the maximum reflectance is 1.12% and the average reflectance is 0.91% in the wavelength range of 680 nm to 1350 nm.

In the case where the antireflection coating is formed on a substrate having a refractive index of 1.65, the maximum reflectance is 1.11% and the average reflectance is 0.74% in the wavelength range of 400 nm to 680 nm, and the maximum reflectance is 1.52% and the average reflectance is 0.99% in the wavelength range of 680 nm to 1350 nm.

In the case where the antireflection coating is formed on a substrate having a refractive index of 1.80, the maximum reflectance is 1.28% and the average reflectance is 0.87% in the wavelength range of 400 nm to 680 nm, and the maximum reflectance is 1.49% and the average reflectance is 0.88% in the wavelength range of 680 nm to 1350 nm.

Examples 10 to 13

Figure 18:
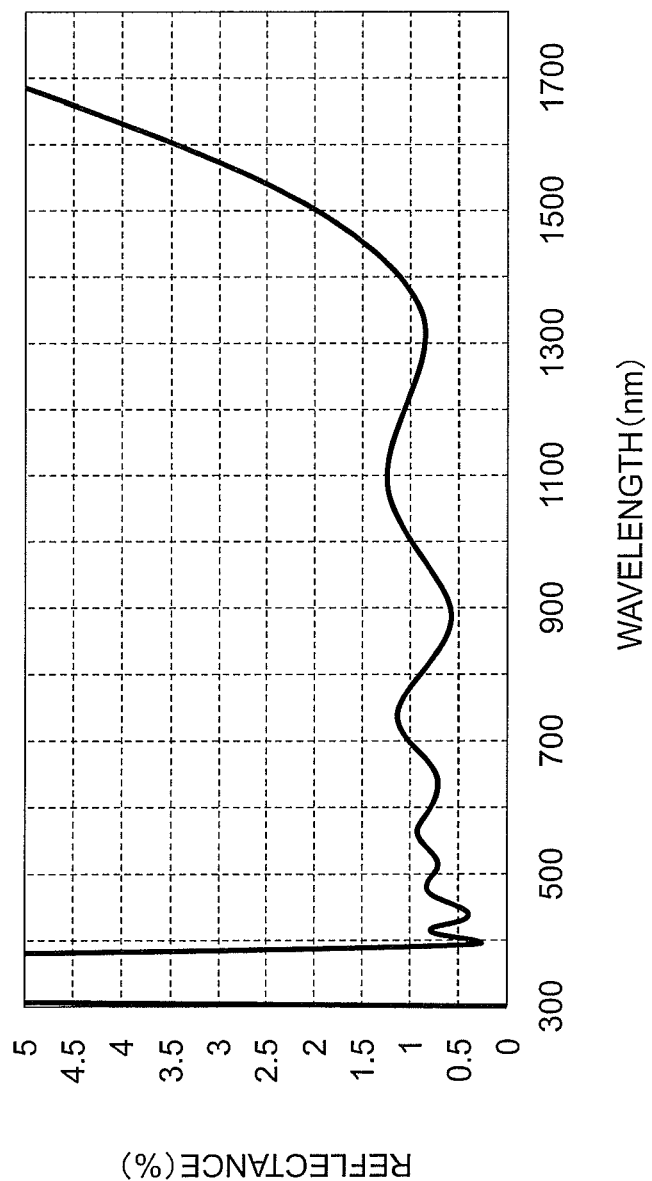
FIG. 18 is a graph showing reflectance characteristics of the antireflection coating according to example 10.
Figure 21:
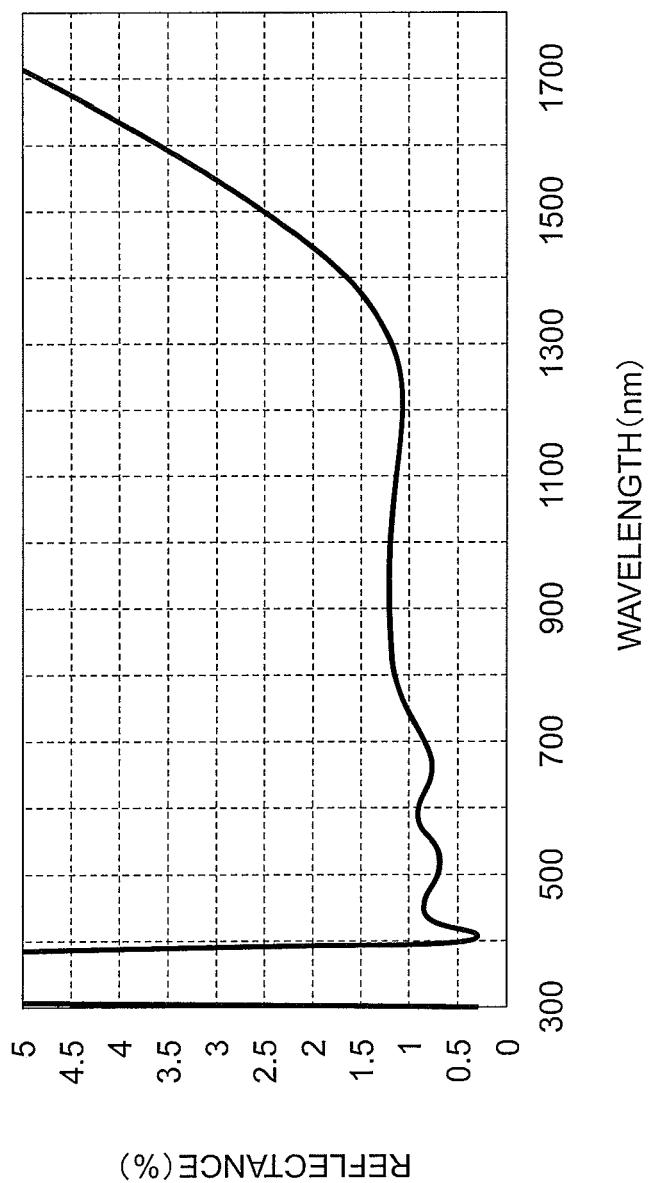
FIG. 21 is a graph showing reflectance characteristics of the antireflection coating according to example 11.
Figure 23:
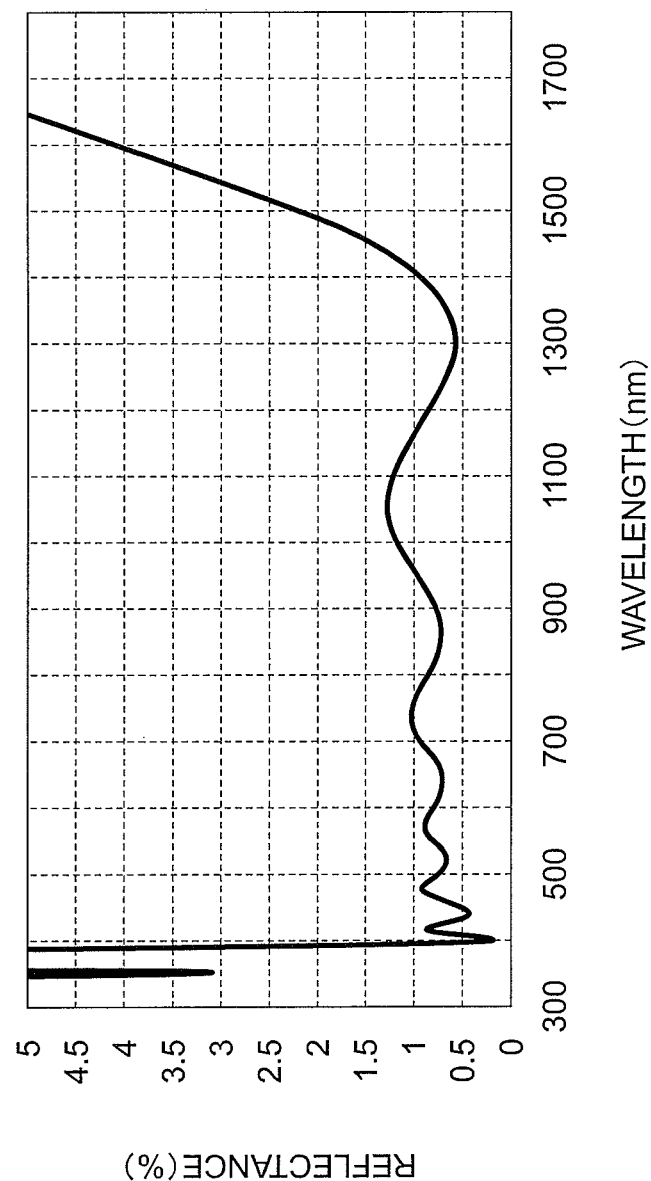
FIG. 23 is a graph showing reflectance characteristics of the antireflection coating according to example 12.
Figure 25:
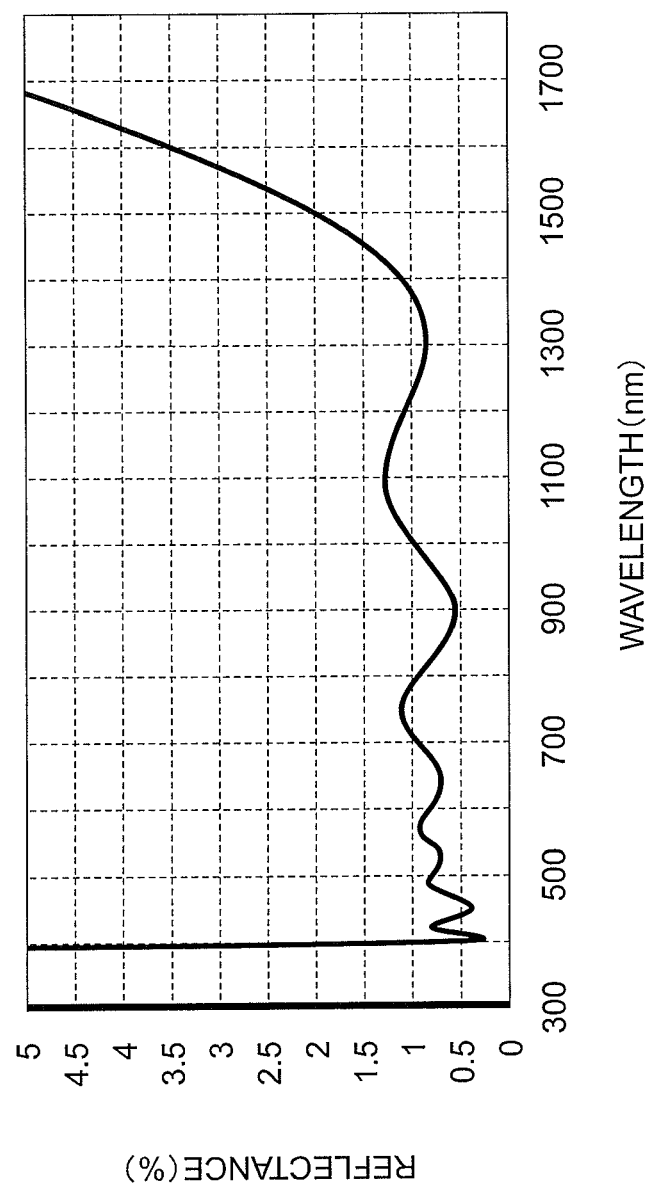
FIG. 25 is a graph showing reflectance characteristics of the antireflection coating according to example 13.
Figure 26:
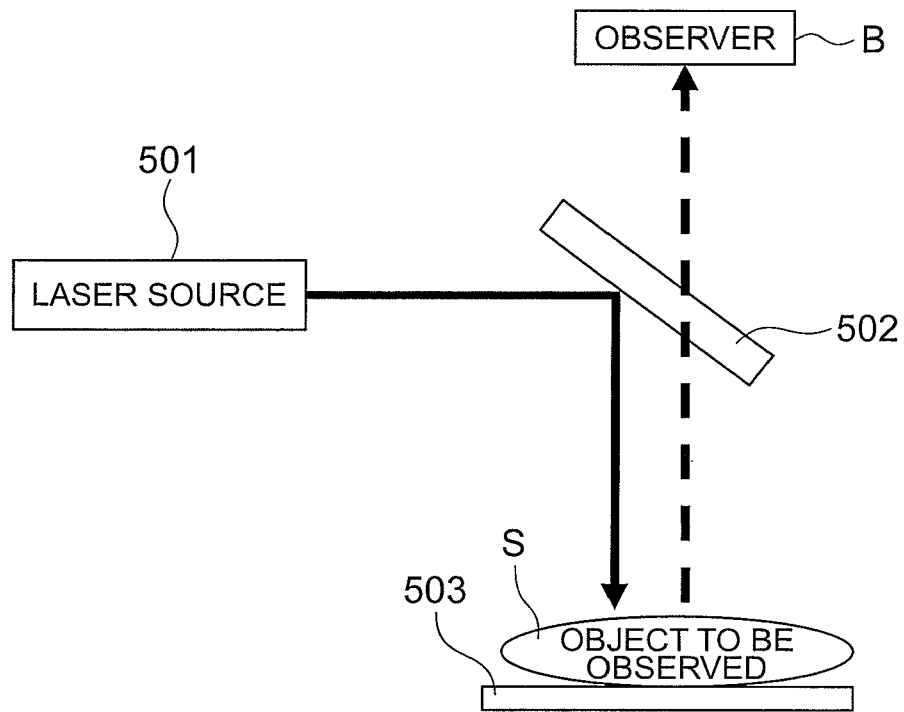
FIG. 26 is a diagram showing the basic construction of a conventional multiphoton absorption microscope.

FIG. 17 is a table showing specifications of the layer structure of an antireflection coating according to example 10. FIG. 18 is a graph showing reflectance characteristics of the antireflection coating according to example 10. FIG. 19 is a table showing the average reflectance and the maximum reflectance of the antireflection coatings according to examples 10, 11, 12 and 13. FIG. 20 is a table showing specifications of the layer structure of the antireflection coating according to example 11. FIG. 21 is a graph showing reflectance characteristics of the antireflection coating according to example 11. FIG. 22 is a table showing specifications of the layer structure of the antireflection coating according to example 12. FIG. 23 is a graph showing reflectance characteristics of the antireflection coating according to example 12. FIG. 24 is a table showing specifications of the layer structure of the antireflection coating according to example 13. FIG. 25 is a graph showing reflectance characteristics of the antireflection coating according to example 13.

FIGS. 17, 20, 22, and 24 show the optical layer thickness of the layers.

FIG. 19 shows the average reflectance and the maximum reflectance of the antireflection coatings according to examples 10 to 13.

The optical layer thickness, which is defined as the product of the refractive index nH, nL and the physical thickness D, of the layers in the deposition structure satisfies the following conditions respectively. Here, the optical layer thickness is expressed in a unit where a quarter of design wavelength is expressed as 1.00 at the design wavelength of 550 nm.

1st layer: 0.11<nHd<0.25,
2nd layer: 0.33<nLd<0.72,
3rd layer: 0.33<nHd<0.60,
4th layer: 0.23<nLd<0.54,
5th layer: 0.63<nHd<0.88,
6th layer: 0.08<nLd<0.22,
7th layer: 1.23<nHd<2.29,
8th layer: 0.06<nLd<0.15,
9th layer: 0.59<nHd<0.94,
10th layer: 0.34<nLd<0.44,
11th layer: 0.23<nHd<0.42,
12th layer: 1.15<nLd<1.27.

Example 10

As shown in FIG. 17, the antireflection coating according to example 10 has a deposition structure made up of twelve layers in which layers of $Ta_2O_5$ (having a refractive index nH of 2.22) as a high refractive index material and layers of $SiO_2$ (having a refractive index nL of 1.45) or $MgF_2$ (having a refractive index nL of 1.38) as a low refractive index material are deposited alternately on a substrate having a refractive index of 1.49. The layers of $Ta_2O_5$ as a high refractive index material are arranged as the first, third, fifth, seventh, ninth, and eleventh layers. Here, the layers are numbered in order from the side of the substrate. The layers of $SiO_2$ as a low refractive index material are arranged as the second, fourth, sixth, eighth, and tenth layers. The layer of $MgF_2$ as a low refractive index material is arranged as the twelfth layer (the outermost layer).

As shown in FIGS. 18 and 19, in the wavelength range of 400 nm to 680 nm, the antireflection coating according to example 10 has a reflectance of 1.26% at the maximum and 0.93% on an average, which is lower than 1.5%, and in the wavelength range of 680 nm to 1350 nm, the antireflection coating according to example 10 has a reflectance of 0.97% at the maximum and 0.75% on an average, showing a reflectance characteristic lower than 2.0%.

Example 11

As shown in FIG. 20, the antireflection coating according to example 11 has a deposition structure made up of twelve layers in which layers of $HfO_2$ (having a refractive index nH of 1.99) as a high refractive index material and layers of $SiO_2$ (having a refractive index nL of 1.45) or $MgF_2$ (having a refractive index nL of 1.38) as a low refractive index material are deposited alternately on a substrate having a refractive index of 1.57. The layers of $HfO_2$ as a high refractive index material are arranged as the first, third, fifth, seventh, ninth, and eleventh layers. Here, the layers are numbered in order from the side of the substrate. The layers of $SiO_2$ as a low refractive index material are arranged as the second, fourth, sixth, eighth, and tenth layers. The layer of $MgF_2$ as a low refractive index material is arranged as the twelfth layer (the outermost layer).

As shown in FIGS. 19 and 21, in the wavelength range of 400 nm to 680 nm, the antireflection coating according to example 11 has a reflectance of 1.39% at the maximum and 0.93% on an average, which is lower than 1.5%, and in the wavelength range of 680 nm to 1350 nm, the antireflection coating according to example 11 has a reflectance of 1.16% at the maximum and 0.79% on an average, showing a reflectance characteristic lower than 2.0%.

Example 12

As shown in FIG. 22, the antireflection coating according to example 12 has a deposition structure made up of twelve layers in which layers of $TiO_2$ (having a refractive index nH of 2.32) as a high refractive index material and layers of $MgF_2$ (having a refractive index nL of 1.38) as a low refractive index material are deposited alternately on a substrate having a refractive index of 1.57. The layers of $TiO_2$ as a high refractive index material are arranged as the first, third, fifth, seventh, ninth, and eleventh layers. Here, the layers are numbered in order from the side of the substrate. The layers of $MgF_2$ as a low refractive index material is arranged as the second, fourth, sixth, eighth, tenth, and twelfth (outermost) layers.

As shown in FIGS. 19 and 21, in the wavelength range of 400 nm to 680 nm, the antireflection coating according to example 12 has a reflectance of 1.30% at the maximum and 0.93% on an average, which is lower than 1.5%, and in the wavelength range of 680 nm to 1350 nm, the antireflection coating according to example 12 has a reflectance of 0.93% at the maximum and 0.74% on an average, showing a reflectance characteristic lower than 2.0%.

Example 13

In the antireflection coatings according to the above-described examples, an additional layer (s) may be provided between the optical element and the first layer and/or on the outer side of the twelfth layer for the purpose of enhancing the adhesion to the surface of an optical element or enhancing water repellency, anti-fogging, and/or durability of the outermost layer of the optical element applied with the antireflection coating, as long as optical characteristics are not affected significantly.

As an example of such an arrangement, the antireflection coating according to example 13 has an $SiO_2$ overcoating applied on the outer side of the twelfth layer of the deposition structure having the same layers as example 10.

Specifically, as shown in FIG. 24, the antireflection coating according to example 13 has a deposition structure made up of twelve layers in which layers of $Ta_2O_5$ (having a refractive index nH of 2.22) as a high refractive index material and layers of $SiO_2$ (having a refractive index nL of 1.45) or $MgF_2$ (having a refractive index nL of 1.38) as a low refractive index material are deposited alternately on a substrate having a refractive index of 1.49 and additionally has a layer of $SiO_2$ as the thirteenth layer deposited on the outermost layer. The layers of $Ta_2O_5$ as a high refractive index material are arranged as the first, third, fifth, seventh, ninth, and eleventh layers. Here, the layers are numbered in order from the side of the substrate. The layers of SiO$_2$ as a low refractive index material are arranged as the second, fourth, sixth, eighth, tenth, and thirteenth layers. The layer of MgF$_2$ as a low refractive index material is arranged as the twelfth layer.

As shown in FIGS. 19 and 25, in the wavelength range of 400 nm to 680 nm, the antireflection coating according to example 13 has a reflectance of 1.26% at the maximum and 0.93% on an average, which is lower than 1.5%, and in the wavelength range of 680 nm to 1350 nm, the antireflection coating according to example 13 has a reflectance of 0.97% at the maximum and 0.75% on an average, showing a reflectance characteristic lower than 2.0%.

INDUSTRIAL APPLICABILITY

As described in the foregoing, the antireflection coating according to the present invention is useful for use in a multiphoton absorption microscope that needs an antireflection coating for an objective lens in a wavelength range ranging from the visible right range to the near infrared range.

REFERENCE SIGNS LIST

101: layer source
102: multi-layer filter
103: observation table
110: optical system
S: object to be observed

The invention claimed is:

1. An antireflection coating comprising a deposition structure made up of twelve layers in which layers of a high refractive index material having a refractive index of 1.95 to 2.32 and layers of a low refractive index material having a refractive index of 1.35 to 1.46 are alternately stacked one on top of the other with an outermost one of the layers being exposed to air and defining a light receiving surface, the outermost layer being a layer of MgF2, the reflectance of the antireflection coating relative to light impinging on the light receiving surface being not higher than 1.5% throughout the wavelength range of 400 nm to 680 nm and not higher than 2.0% throughout in the wavelength range of 680 nm to 1350 nm, wherein the coating is formed on a substrate and the high refractive index layers are arranged as first, third, fifth, seventh, ninth, and eleventh layers, the low refractive index layers are arranged as second, fourth, sixth, eighth, tenth, and twelfth layers, where the layers are numbered in order from the side of the substrate, and the optical layer thickness OT of each respective layer is defined as the product of its refractive index and its physical film thickness, the optical thickness OT of each of the respective layers satisfying the following conditions: 1st layer: 0.11<OT<0.25, 2nd layer: 0.33<OT<0.72, 3rd layer: 0.33<OT<0.60, 4th layer: 0.23<OT<0.54, 5th layer: 0.63<OT<0.88, 6th layer: 0.08<OT<0.22, 7th layer: 1.23<OT<2.29, 8th layer: 0.06<OT<0.15, 9th layer: 0.59<OT<0.94, 10th layer: 0.34<OT<0.44, 11th layer: 0.23<OT<0.42, and 12th layer: 1.15<OT<1.27.

2. The antireflection coating according to claim 1, wherein the high refractive index material is TiO$_2$, Nb$_2$O$_5$, Ta$_2$O$_5$, HfO$_2$, or a mixture of these materials with La and/or Zr, and the low refractive index material is SiO$_2$, MgF$_2$, or a mixture of SiO$_2$ and MgF$_2$.

3. The antireflection coating according to claim 1, wherein the refractive index of the substrate is in the range from 1.48 to 1.8.

4. An optical system comprising two or more substrates on which an antireflection coating according to claim 1 is formed.

5. An optical instrument comprising an optical system according to claim 4.

* * * * *